US012584620B2

(12) United States Patent
Liu et al.

(10) Patent No.: US 12,584,620 B2
(45) Date of Patent: Mar. 24, 2026

(54) LAMP WITH ROTATABLE KNOB OPERATED SLIDING SWITCH

(71) Applicant: FOSHAN ELECTRICAL AND LIGHTING CO., LTD., Guangdong (CN)

(72) Inventors: Xiaofei Liu, Guangdong (CN); Shijun Fan, Guangdong (CN); Yong Zhang, Guangdong (CN); Fuguo Huang, Guangdong (CN); Yongheng Ye, Guangdong (CN)

(73) Assignee: FOSHAN ELECTRICAL AND LIGHTING CO., LTD., Foshan (CN)

( * ) Notice: Subject to any disclaimer, the term of this patent is extended or adjusted under 35 U.S.C. 154(b) by 0 days.

(21) Appl. No.: 18/950,154

(22) Filed: Nov. 17, 2024

(65) Prior Publication Data

US 2025/0305665 A1 Oct. 2, 2025

(30) Foreign Application Priority Data

Apr. 2, 2024 (CN) ........................ 202410392313.X

(51) Int. Cl.
*F21V 23/04* (2006.01)
*F21K 9/238* (2016.01)

(52) U.S. Cl.
CPC .............. *F21V 23/04* (2013.01); *F21K 9/238* (2016.08)

(58) Field of Classification Search
CPC .......... F21V 23/04; F21V 17/12; F21K 9/238; F21K 9/23; H01H 1/365; H01H 15/005; H01H 19/001; H01H 21/18
See application file for complete search history.

(56) References Cited

U.S. PATENT DOCUMENTS

| | | | | |
|---|---|---|---|---|
| 3,558,834 A * | 1/1971 | Zielke | H01H 19/001 200/11 DA |
| 3,632,909 A * | 1/1972 | Rowley | H01H 1/403 200/260 |
| 4,034,178 A * | 7/1977 | Koppenheffer | H01H 19/001 200/291 |
| 7,176,400 B1 * | 2/2007 | Yeh | F21S 41/663 200/339 |
| 7,220,926 B2 * | 5/2007 | Mano | H01H 15/06 200/16 D |
| 10,893,587 B2 * | 1/2021 | Halliwell | F21K 9/238 |
| 11,248,753 B1 * | 2/2022 | Li | F21K 9/232 |
| 11,320,128 B2 * | 5/2022 | Wang | A01G 9/249 |
| 12,352,393 B2 * | 7/2025 | Xu | F21V 31/00 |
| 2011/0163668 A1 * | 7/2011 | Jonsson | H05B 47/19 315/129 |
| 2016/0189886 A1 * | 6/2016 | Terasawa | H01H 1/027 200/252 |
| 2020/0187319 A1 * | 6/2020 | Jiang | F21V 23/006 |
| 2024/0145971 A1 * | 5/2024 | Gomyo | H01H 1/36 |

* cited by examiner

*Primary Examiner* — Ismael Negron

(57) ABSTRACT

The lamp includes a housing, a light-emitting assembly disposed in the housing, a switching assembly having a knob, a substrate with a plurality of contacts, a slider, and a conductive sheet disposed on the slider. The knob is coupled to the housing and configured for rotation relative to the housing. The slider is disposed on the substrate and configured to slide along a predetermined trajectory relative to the substrate driven by rotation of the knob. The conductive sheet is configured to slide into communication with different ones of the plurality of contacts such that illumination parameters of the lamp are adjusted.

20 Claims, 7 Drawing Sheets

LAMP WITH ROTATABLE KNOB OPERATED SLIDING SWITCH

CROSS REFERENCE TO RELATED APPLICATIONS

The present application claims the benefit of Chinese Patent Application No. 202410392313.X filed on Apr. 2, 2024, the contents of which are incorporated herein by reference in their entirety.

TECHNICAL FIELD

The present disclosure relates to a lamp, and in particular, to a knob dimming lamp.

BACKGROUND

At present, the common dial color-matching lamps on the market are mainly adjusted by the common dial switches on the market. For example, a PCB is added below a light source bead board, a dial switch is placed on the PCB, a rotating sleeve is provided on the surface of the housing, and the rotation of the rotating sleeve drives the dial switch to realize the dial gear-shifting. The other solution is to provide a dial sheet on the surface of the housing, and the slidable dial sheet drives a dial switch provided in the housing to realize the dial gear-shifting. Both of the above modes require expensive dial switches. Moreover, since a slidable rotating sleeve or dial sheet is provided on the housing, the sealing performance of the lamp is poor, and water vapor and the like can easily enter the lamp, thus shortening the service life of the lamp.

SUMMARY

To solve the defects in the prior art, the present disclosure provides a knob dimming lamp, which can adjust illumination parameters through a dimming knob, thereby making control more sensitive and convenient, simplifying the existing dimming control structure, and reducing the production cost.

To solve the above technical problems, embodiments of the present disclosure provide a knob dimming lamp, including a housing, a light-emitting assembly, and a knob dimming assembly, where the light-emitting assembly is disposed in the housing;

- the knob dimming assembly includes a dimming knob, a substrate, a slider, and a conductive sheet; the dimming knob is disposed on the housing and capable of rotating relative to the housing;
- the slider is disposed on the substrate and capable of sliding at a predetermined trajectory relative to the substrate;
- the dimming knob abuts against a surface of the slider;
- a plurality of contacts are provided on the substrate, and the conductive sheet is disposed on the slider;
- the contacts are electrically connected to the light-emitting assembly; and
- the dimming knob in rotation drives the slider to move such that the conductive sheet is communicated with different contacts.

As an improvement to the above solution, a clamping groove is formed in the substrate, the slider includes a sliding body and a buckle, and the buckle extends into the clamping groove.

As an improvement to the above solution, a plurality of limiting grooves are formed in a wall of the clamping groove, a limiting rod is provided on the sliding body, and one end of the limiting rod is located in the limiting groove.

As an improvement to the above solution, the sliding body is further provided with a limiting rod clearance groove, the limiting rod clearance groove vertically passes through the sliding body, and the limiting rod is disposed in the limiting rod clearance groove.

As an improvement to the above solution, the clamping groove is arc-shaped, the buckle includes an offset member and a claw, a side wall of the offset member abuts against a side wall of the clamping groove, and the claw is disposed at a bottom end of the offset member and snap-fitted on a bottom surface of the substrate.

As an improvement to the above solution, the buckle includes a first front buckle and a first rear buckle provided in a same clamping groove, the offset member of the first front buckle abuts against one side wall of the clamping groove, and the offset member of the first rear buckle abuts against the other side wall of the clamping groove.

As an improvement to the above solution, there are two clamping grooves in total, including a first clamping groove and a second clamping groove respectively extending along concentric arcs with different diameters; the buckle includes a second front buckle and a second rear buckle provided in different clamping grooves, the second front buckle is disposed in the first clamping groove, and the second rear buckle is disposed in the second clamping groove.

As an improvement to the above solution, the conductive sheet includes an elastic sheet fixing portion, an elastic sheet deformation portion, and elastic sheet contact portions; the elastic sheet fixing portion is provided with a U-shaped structure; the elastic sheet deformation portion is connected to the elastic sheet fixing portion and the elastic sheet contact portions; the elastic sheet contact portions are symmetrically arranged on two sides of the elastic sheet fixing portion; and elastic sheet contacts are provided at bottoms of the elastic sheet contact portions.

As an improvement to the above solution, locking plates are provided on the two sides of the elastic sheet fixing portion, the locking plates are located in locking plate accommodating holes, and upper ends of the locking plates are connected to the elastic sheet fixing portion; the sliding body is provided with a conductive sheet mounting hole, and the elastic sheet fixing portion extends into the conductive sheet mounting hole.

As an improvement to the above solution, the sliding body is provided with locking grooves on two sides of the conductive sheet mounting hole, and the locking plates are disposed in the locking grooves.

As an improvement to the above solution, the sliding body is provided with a first abutting surface and a second abutting surface, the first abutting surface and the second abutting surface both abut against an upper surface of the substrate, the first abutting surface is disposed on aside of the sliding body close to the contacts, the second abutting surface is disposed on aside of the sliding body away from the contacts, and the first abutting surface is longer than the second abutting surface.

As an improvement to the above solution, the sliding body is provided with a toothed surface, the dimming knob is provided with a gear, and the gear is engaged with the toothed surface.

As an improvement to the above solution, the sliding body and/or the dimming knob are provided with a flexible friction layer, and the sliding body and/or the dimming knob abut against each other through the flexible friction layer.

As an improvement to the above solution, the housing is provided with a knob sleeve, and a first limiting ring is provided at a tail end of the knob sleeve; a second limiting ring and a knob buckle are provided on aside surface of the dimming knob, the second limiting ring is matched with a front end surface of the first limiting ring, and the knob buckle is matched with a rear end surface of the first limiting ring.

As an improvement to the above solution, a sealing groove is further formed in the side surface of the dimming knob, a sealing ring is provided in the sealing groove, and the sealing ring abuts against an inner wall of the knob sleeve.

As an improvement to the above solution, a first conical surface is provided on a front end surface of the first limiting ring, and the second limiting ring is provided with a second conical surface matched with the first conical surface.

As an improvement to the above solution, the contacts include gear contacts and a common contact, and the gear contacts and the common contact are arranged on a movement trajectory of the conductive sheet.

As an improvement to the above solution, the gear contacts are disposed on two sides of the common contact, the conductive sheet is provided with two elastic sheet contacts, and during movement of the conductive sheet, one elastic sheet contact is kept in contact with the common contact, and the other elastic sheet contact is kept in contact with one of the gear contacts.

As an improvement to the above solution, the knob dimming lamp further includes a lamp holder and a lampshade, where the lamp holder is disposed at a lower part of the housing, and the lampshade is disposed at an upper part of the housing.

As an improvement to the above solution, the substrate is made of an aluminum alloy, and the light-emitting assembly is disposed on the substrate.

As an improvement to the above solution, the light-emitting assembly includes a light source and a drive circuit, the contacts are electrically connected to the drive circuit, and the drive circuit is electrically connected to the light source.

As an improvement to the above solution, the housing is provided with a conical working portion, the knob dimming assembly is located in the conical working portion, the substrate is a circular flat plate, the lampshade includes a shade body flat plate and a light refracting mechanism, the substrate is opposite to the shade body flat plate, the light-emitting assembly is located in a center of the substrate, and the light refracting mechanism is disposed in a center of the shade body flat plate and includes a lens and/or a threaded lens.

As an improvement to the above solution, the housing is cylindrical, square, or trapezoidal.

Implementing the embodiments of the present disclosure has the following beneficial effects:

In this solution, the dimming knob drives the slider on the substrate to slide on the surface of the substrate, such that the conductive sheet disposed on the slider are communicated with different contacts to adjust illumination parameters such as different color temperatures and brightness. This solution simplifies the existing dimming control structure and reduces the production cost. The illumination parameters are adjusted through the dimming knob, such that the control is more sensitive and convenient. Compared with the design of a sliding key, the axially rotating dimming knob has a fixed position relative to the housing in the adjustment process, thereby achieving a high degree of sealing.

DETAILED DESCRIPTION

Figure 1:
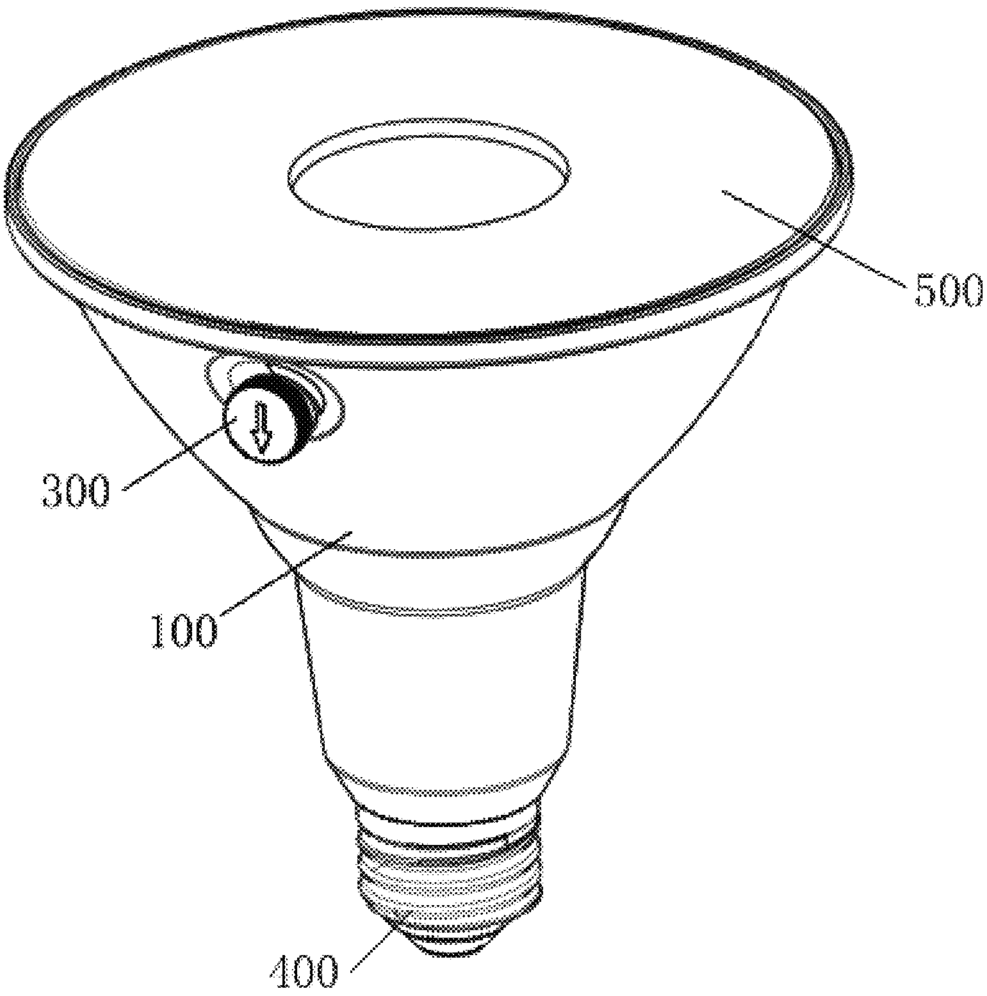
FIG. 1 is a schematic diagram of an external structure of a knob dimming lamp according to the present disclosure.

To make the objectives, technical solutions, and advantages of the present disclosure clearer, the following further describes the present disclosure in detail with reference to the accompanying drawings. It should be noted that orientation terms such as “upper”, “lower”, “left”, “right”, “front”, “rear”, “inner”, and “outer” that appear or are about to appear in the present disclosure are only based on the accompanying drawings of the present disclosure, and do not specifically limit the present disclosure.

As shown in FIG. 1 to FIG. 4, the first embodiment of the present disclosure provides a knob dimming lamp, including a housing 100, a light-emitting assembly 200, and a knob dimming assembly 300. The light-emitting assembly 200 is disposed in the housing 100.

The knob dimming assembly 300 includes a dimming knob 1, a substrate 2, a slider 3, and a conductive sheet 4. the dimming knob 1 is disposed on the housing 100 and capable of rotating relative to the housing 100.

The slider 3 is disposed on the substrate 2 and capable of sliding at a predetermined trajectory relative to the substrate 2.

The dimming knob 1 abuts against a surface of the slider 3.

A plurality of contacts 5 are provided on the substrate 2, and the conductive sheet 4 is disposed on the slider 3.

The contacts 5 are electrically connected to the light-emitting assembly 200.

The dimming knob 1 in rotation drives the slider 3 to move such that the conductive sheet 4 is communicated with different contacts 5.

In this solution, the dimming knob 1 drives the slider 3 on the substrate 2 to slide on the surface of the substrate 2, such that the conductive sheet 4 disposed on the slider 3 are communicated with different contacts 5 to adjust illumination parameters such as different color temperatures and brightness. This solution simplifies the existing dimming control structure and reduces the production cost. The illumination parameters are adjusted through the dimming knob 1, such that the control is more sensitive and convenient. Compared with the design of a sliding key, the axially rotating dimming knob 1 has a fixed position relative to the housing in the adjustment process, thereby achieving a high degree of sealing.

According to the first embodiment of the present disclosure, to limit the movement trajectory of the slider 3 relative to the substrate 2, a clamping groove 21 is formed in the substrate 2, the slider 3 includes a sliding body 31 and a buckle 32, and the buckle 32 extends into the clamping groove 21. The buckle 32 is configured to prevent the slider 3 from being separated from the substrate 2, and under driving, the slider 3 moves along the clamping groove 21.

To ensure reliable connection between the conductive sheet 4 and the contacts 5, the conductive sheet 4 is stopped at a position corresponding to a predetermined gear. A plurality of limiting grooves 22 are formed in a wall of the clamping groove 21, a limiting rod 33 is provided on the sliding body 31, and one end of the limiting rod 33 is located in the limiting groove 22. It should be noted that the limiting rod 33 has a certain elasticity. When the slider 3 moves, the limiting rod 33 also moves. In this process, one end of the limiting rod 33 is separated from the limiting groove where the end is originally located and then enters an adjacent limiting groove. The limiting rod 33 may be a round rod, and two side walls 221 of the limiting groove 22 may also be set as arc surfaces or inclined surfaces. When the limiting rod 33 is about to enter the limiting groove 22, even if a drive force disappears, the slider 3 may also reach the central position of the limiting groove 22 along the arc-surface or inclined-surface side walls of the limiting groove 22 under the elastic force of the limiting rod 33. The position of each limiting groove 22 is set such that when the limiting rod 33 is located in the center of the limiting groove 22, the slider 3 just moves the conductive sheet 4 to a position where certain two or more contacts 5 are reliably conducted. By means of the above design, an operator has no need to precisely rotate a knob but only needs to rotate the knob to an approximate position, then the dimming knob 1 and the slider 3 can be stopped on the predetermined gear, such that the control is convenient, and the texture is good.

Preferably, to ensure that the limiting rod 33 has enough movement space and keeps an elastic force required by normal working during long-time use, the sliding body 31 is further provided with a limiting rod clearance groove 311, the limiting rod clearance groove 311 vertically passes through the sliding body 31, and the limiting rod 33 is disposed in the limiting rod clearance groove 311.

Figure 8:
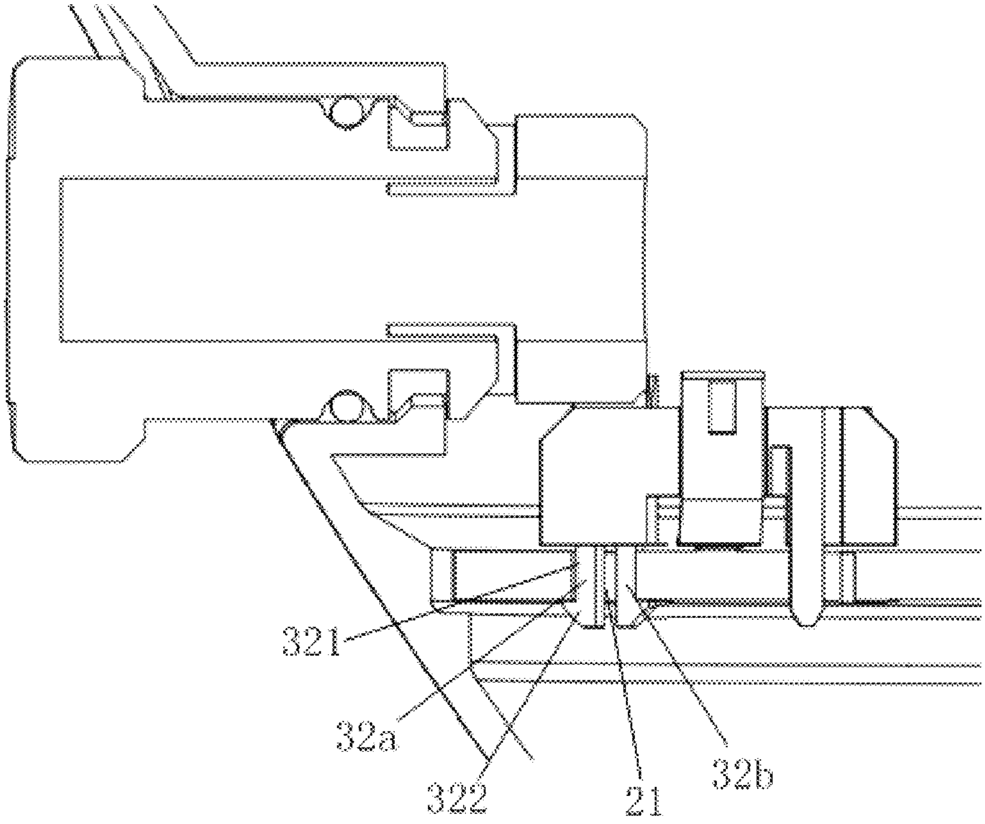
FIG. 8 is a schematic structural diagram of a slider in a first embodiment of a knob dimming lamp according to the present disclosure.

As shown in FIG. 8, preferably, the clamping groove 21 is arc-shaped, the buckle 32 includes an offset member 321 and a claw 322, a side wall of the offset member 321 abuts against a side wall of the clamping groove 21, and the claw 322 is disposed at a bottom end of the offset member 321 and snap-fitted on a bottom surface of the substrate 2. When the buckle 32 is mounted in the arc-shaped clamping groove, the offset member 321 provides a position offset for the claw 322, and the claw 322 is configured to hook the substrate 2 for preventing the slider 3 from being separated from the substrate 2. In addition, after the offset member 321 is mounted, the side wall thereof abuts against the side wall of the clamping groove 21 to provide horizontal limiting for the slider 3, such that the slider 3 moves along the clamping groove 21 when being stressed to move. The movement of the slider 3 is implemented under the cooperation between the buckle 32 and the clamping groove 21. On the one hand, the movement smoothness of the slider 3 is ensured, and on the other hand, the structure and the assembly steps are simplified, and the cost is saved.

The buckle 32 includes a first front buckle **32*a* and a first rear buckle 32*b* provided in a same clamping groove 21, the offset member of the first front buckle 32*a* abuts against one side wall of the clamping groove 21, and the offset member of the first rear buckle 32*b* abuts against the other side wall of the clamping groove 21. The first front buckle 32*a* and the first rear buckle 32*b* cooperate to reliably position the slider 3 in a single clamping groove 21, such that the volume of the slider 3 can be reduced, the sliding friction of the slider 3 can be reduced, and the volume of the dimming knob 1** can also be reduced correspondingly, thereby facilitating the promotion in lamps with a small volume or compact internal space.

Figure 9:
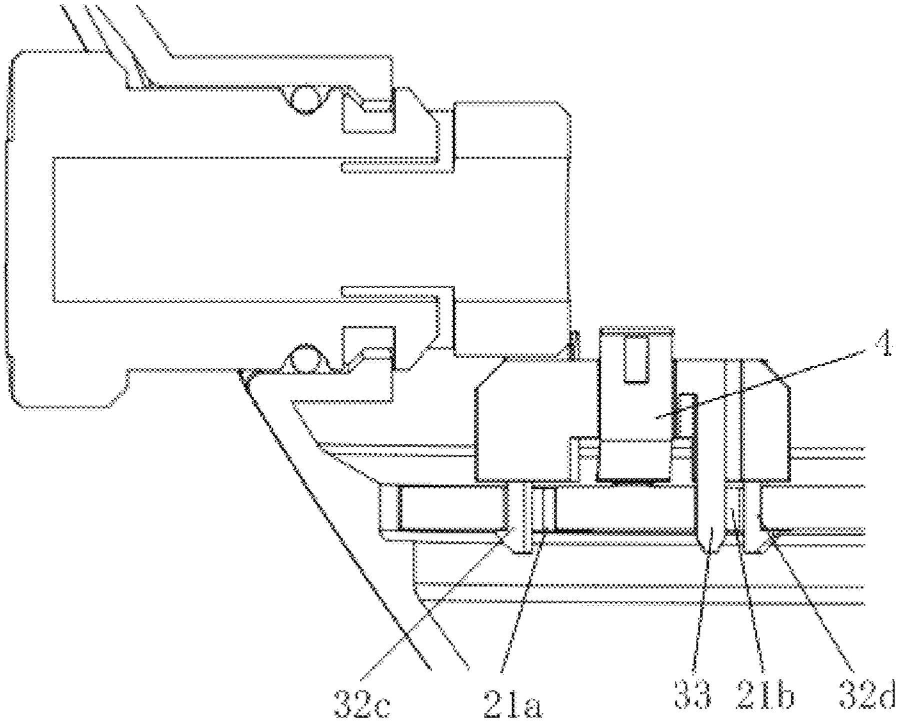
FIG. 9 is a schematic structural diagram of a slider in a second embodiment of a knob dimming lamp according to the present disclosure.

As shown in FIG. 9, the second embodiment of the present disclosure differs from the first embodiment in that: there are two clamping grooves 21 in total, including a first clamping groove **21*a* and a second clamping groove 21*b* respectively extending along concentric arcs with different diameters; the buckle 32 include a second front buckle 32*c* and a second rear buckle 32*d* provided in different clamping groove 21, the second front buckle 32*c* are disposed in the first clamping groove 21*a*, and the second rear buckle 32*d* are disposed in the second clamping groove 21*b*. In this embodiment, the first clamping groove 21*a* and the second clamping groove 21*b* respectively extending along the concentric arcs with different diameters are provided, and the contacts 5 are disposed between the first clamping groove 21*a* and the second clamping groove 21*b*. Under the cooperation between the second front buckle 32*c* and the first clamping groove 21*a* and the cooperation between the second rear buckle 32*d* and the second clamping groove 21*b*, the conductive sheet 4 is disposed between two buckles. The slider 3 applies a lower pressure to the conductive sheet 4, and tensions of the second front buckle 32*c* and the second rear buckle 32*d* are located on two sides of the lower pressure, such that the system is stably stressed, excessive wear caused by non-uniform local stress after long-time use is avoided, the working reliability of the conductive sheet 4 and the contacts 5** is promoted, and the service life is prolonged.

Figure 4:
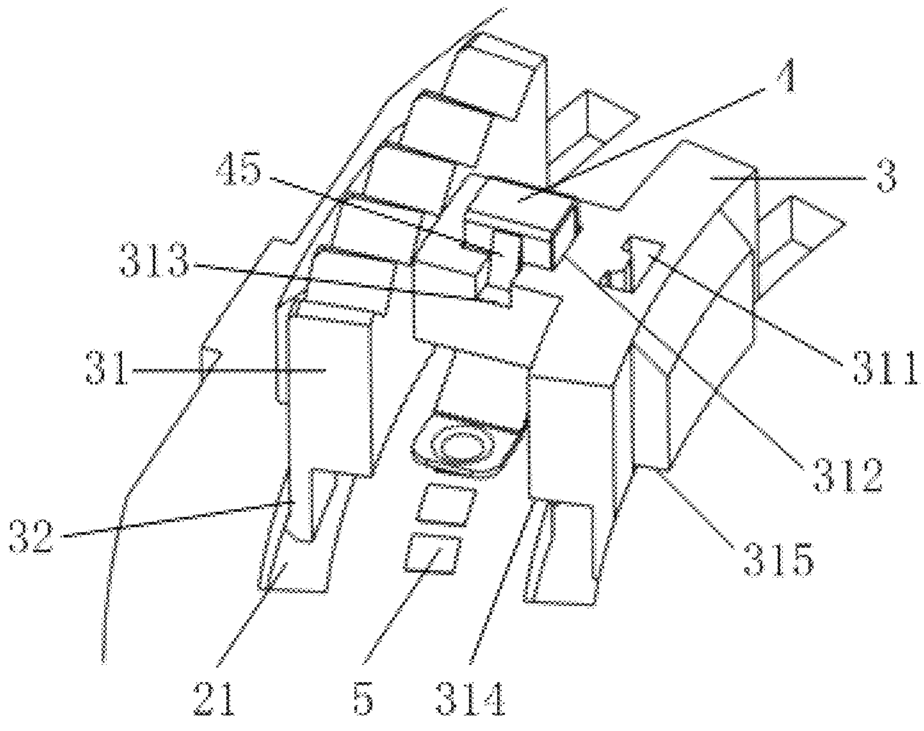
FIG. 4 is an enlarged view of part B in FIG. 3.
Figure 5:
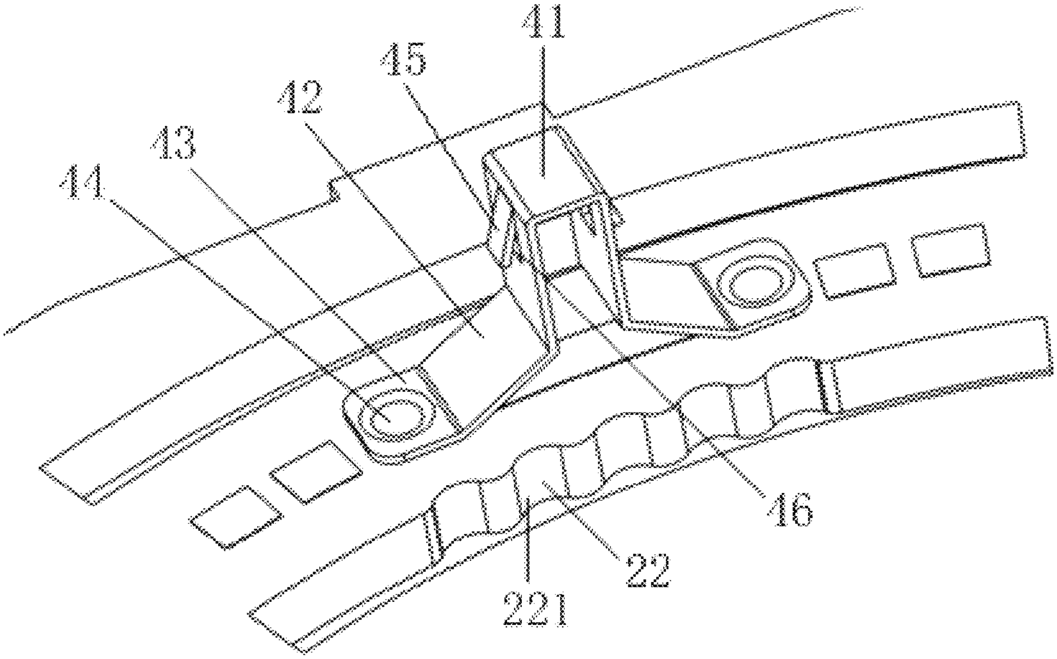
FIG. 5 is a schematic diagram of a matching state between a conductive sheet and contacts according to the present disclosure.

As shown in FIG. 4 and FIG. 5, the conductive sheet 4 includes an elastic sheet fixing portion 41, an elastic sheet deformation portion 42, and elastic sheet contact portions 43; the elastic sheet fixing portion 41 is provided with a U-shaped structure; the elastic sheet deformation portion 42 is connected to the elastic sheet fixing portion 41 and the elastic sheet contact portions 43; the elastic sheet contact portions 43 are symmetrically arranged on two sides of the elastic sheet fixing portion 41; and elastic sheet contacts 44 are provided at bottoms of the elastic sheet contact portions 43. Locking plates 45 are provided on the two sides of the elastic sheet fixing portion 41, the locking plates 45 are located in locking plate accommodating holes 46, and upper ends of the locking plates 45 are connected to the elastic sheet fixing portion 41; the sliding body 31 is provided with a conductive sheet mounting hole 312, and the elastic sheet fixing portion 41 extends into the conductive sheet mounting hole 312. The conductive sheet 4 is fixed under the cooperation between the conductive sheet mounting hole 312 and the elastic sheet fixing portion 41 with the U-shaped structure, such that a heat dissipation space is left for the top and the lower part of the conductive sheet 4, and the material of the slider 3 can also be reduced. The conductive sheet 4 may be an elastic sheet made of an alloy which takes copper as a main component, to provide better conductive performance. The elastic sheet deformation portion 42 is formed by gradually extending outward and tilting downward from the tail end of the elastic sheet fixing portion 41, to provide a contact pressure for the elastic sheet contact portions 43, thereby ensuring that the elastic sheet contact portions 43 are in reliably contact with the corresponding contacts 5.

Specifically, elastic sheet contacts 44 are provided at the bottoms of the elastic sheet contact portions 43, and the elastic sheet can be in contact with two contacts 5 when moving to the predetermined position, to conduct circuits corresponding to the two contacts 5, thereby achieving corresponding control functions.

Preferably, the sliding body 31 is provided with locking grooves 313 on two sides of the conductive sheet mounting hole 312, and the locking plates 45 are disposed in the locking grooves 313. The locking grooves 313 are groove bodies downwards recessed from the upper surface of the sliding body 31. When the conductive sheet 4 is mounted in the conductive sheet mounting hole 312, the elastic sheet fixing portion 41 extends into the conductive sheet mounting hole 312 from bottom to top until the locking plates 45 are in contact with the wall of the conductive sheet mounting hole 312. The elastic sheet fixing portion 41 with the U-shaped structure has a certain elastic deformation capability, and therefore the locking plates 45 can be smoothly mounted in the conductive sheet mounting hole 312 until reaching the locking grooves 313. The locking plates 45 enter the locking grooves 313 under the resilience of the elastic sheet fixing portion 41, then the conductive sheet 4 is fixed in the slider 3. By means of the above structure, the conductive sheet 4 is mounted conveniently. Moreover, after the conductive sheet 4 is fixed, the lower surface thereof is not covered or shielded, such that efficient heat dissipation can be maintained.

During the use of the knob dimming lamp, the sliding smoothness of the slider 3 is particularly important because it affects the rotation feel and the normal service life of the lamp. The sliding body 31 is provided with a first abutting surface 314 and a second abutting surface 315, the first abutting surface 314 and the second abutting surface 315 both abut against an upper surface of the substrate 2, the first abutting surface 314 is disposed on aside of the sliding body 31 close to the contacts 5, the second abutting surface 315 is disposed on aside of the sliding body 31 away from the contacts 5, and the first abutting surface 314 is longer than the second abutting surface 315. It should be noted that the first abutting surface 314 is disposed on the side of the sliding body 31 close to the contacts 5, which mainly ensures the stability of the slider 3 and prevents the slider 3 from tilting in the sliding process, such that the elastic sheet contacts 44 can be kept in stable contact with the contacts 5 on the substrate 2. Moreover, a shorter second abutting surface 315 is provided, a friction force generated by the contact between the second abutting surface 315 and the substrate 2 can be reduced, and the slider 3 slides more smoothly.

Figure 7:
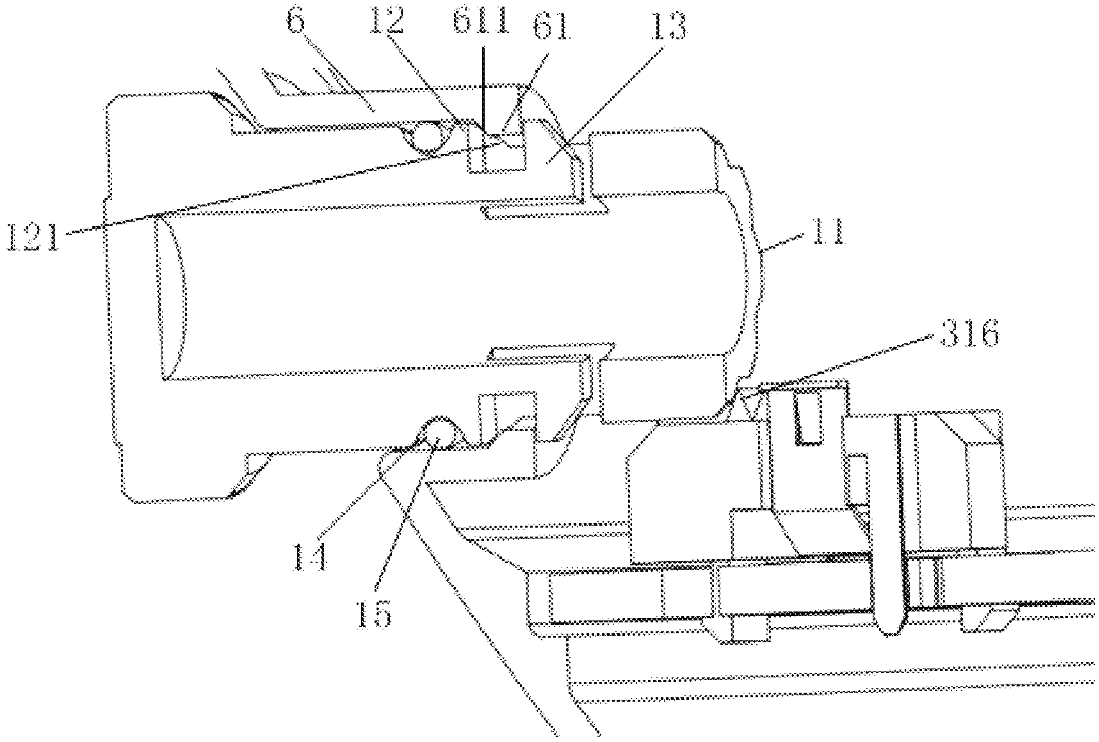
FIG. 7 is an enlarged view of part A in FIG. 2.

As shown in FIG. 7, preferably, the sliding body 31 is provided with a toothed surface 316, the dimming knob 1 is provided with a gear 11, and the gear 11 is engaged with the toothed surface 316. The power of the dimming knob 1 is transferred to the sliding body 31 through the gear 11 and the toothed surface 316 which are engaged with each other, such that the synchronization of the movement of the slider 3 and the rotation of the dimming knob 1 can be ensured. A corresponding pointer pattern can be set on the surface of the dimming knob 1, which brings convenience for the operator to know the current gear conditions.

Figure 10:
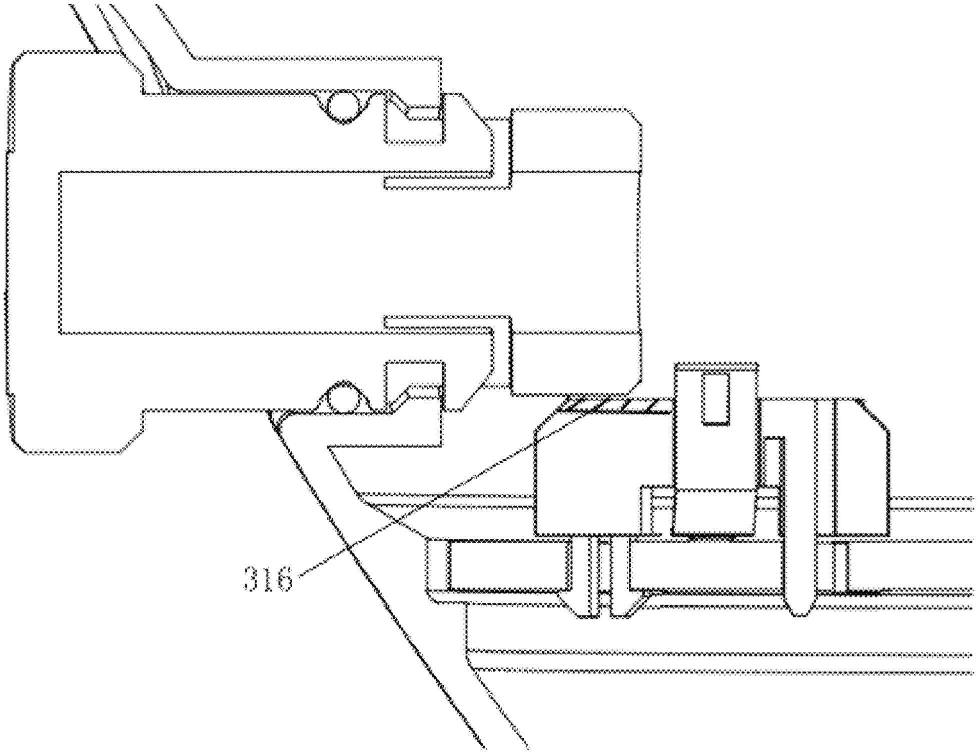
FIG. 10 is a schematic structural diagram of a slider in a third embodiment of a knob dimming lamp according to the present disclosure.

As shown in FIG. 10, the third embodiment of the present disclosure differs from other embodiments in that: the toothed surface 316 is no longer provided on the sliding body 31, and the gear 11 is no longer provided on the dimming knob 1. Instead, the sliding body 31 and/or the dimming knob 1 are provided with a flexible friction layer 316, and the sliding body 31 and/or the dimming knob 1 abut against each other through the flexible friction layer 316. The flexible friction layer 316 may be made of silica gel and other materials to have a large friction force and a certain elasticity. The sliding body 31 and the dimming knob 1 abut against each other, the power is transferred by the flexible friction layer 316 disposed at the connection place of the two, and the rotating force of the dimming knob 1 is transformed into the power of the slider 3 sliding along a sliding groove. The adjustment power is transferred by the flexible friction layer 316, such that the operation has a soft feel, and in particular, when the limiting rod 33 enters a different limiting groove 22, a recoil force generated when the limiting rod 33 enters the limiting groove 22 can be buffered, such that the operator has a richer sense of touch when rotating the dimming knob 1.

As shown in FIG. 7, the housing 100 is provided with a knob sleeve 6, and a first limiting ring 61 is provided at a tail end of the knob sleeve 6; a second limiting ring 12 and a knob buckle 13 are provided on aside surface of the dimming knob 1, the second limiting ring 12 is matched with a front end surface of the first limiting ring 61, and the knob buckle 13 is matched with a rear end surface of the first limiting ring 61. A sealing groove 14 is further formed in the side surface of the dimming knob 1, a sealing ring 15 is provided in the sealing groove 14, and the sealing ring 15 abuts against an inner wall of the knob sleeve 6. The sealing ring 15 ensures the sealing performance between the dimming knob 1 and the rotating sleeve, such that the lamp has certain waterproof performance.

Preferably, a first conical surface 611 is provided on a front end surface of the first limiting ring 61, and the second limiting ring 12 is provided with a second conical surface 121 matched with the first conical surface 611. The first conical surface 611 and the second conical surface 121 cooperate to limit the dimming knob 1 on a predetermined rotating axis and achieve an automatic alignment function.

Figure 6:
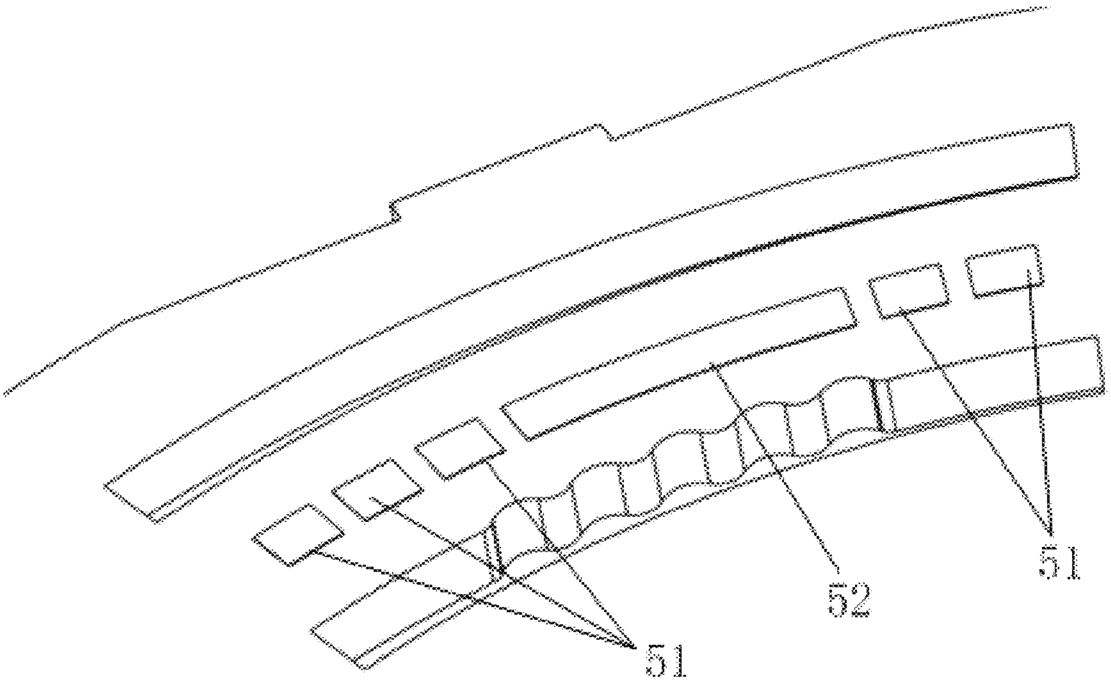
FIG. 6 is a schematic structural diagram of contacts according to the present disclosure.

As shown in FIG. 6, according to specific embodiments of the present disclosure, the contacts 5 include gear contacts 51 and a common contact 52, and the gear contacts 51 and the common contact 52 are arranged on a movement trajectory of the conductive sheet 4. When different gears are selected, the conductive sheet 4 conducts different gear contacts 51 and the common contact 52.

Preferably, the gear contacts 51 are disposed on two sides of the common contact 52, the conductive sheet 4 is provided with two elastic sheet contacts 44, and during movement of the conductive sheet 4, one elastic sheet contact 44 is kept in contact with the common contact 52, and the other elastic sheet contact 44 is kept in contact with one of the gear contacts 51. By means of the above arrangement, the contacts 5 can be arranged more compactly, and a length required by the common contact 52 can also be shortened.

Figure 2:
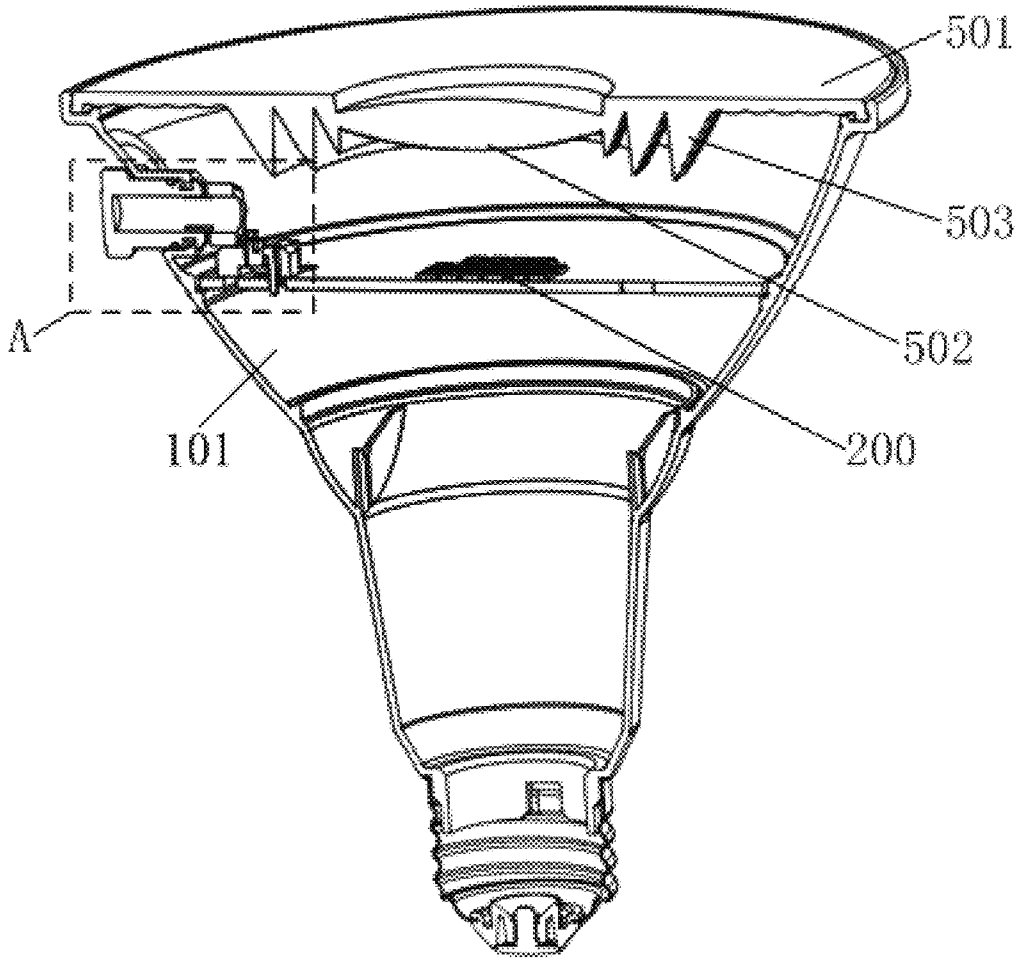
FIG. 2 is a section view of a knob dimming lamp according to the present disclosure.
Figure 3:
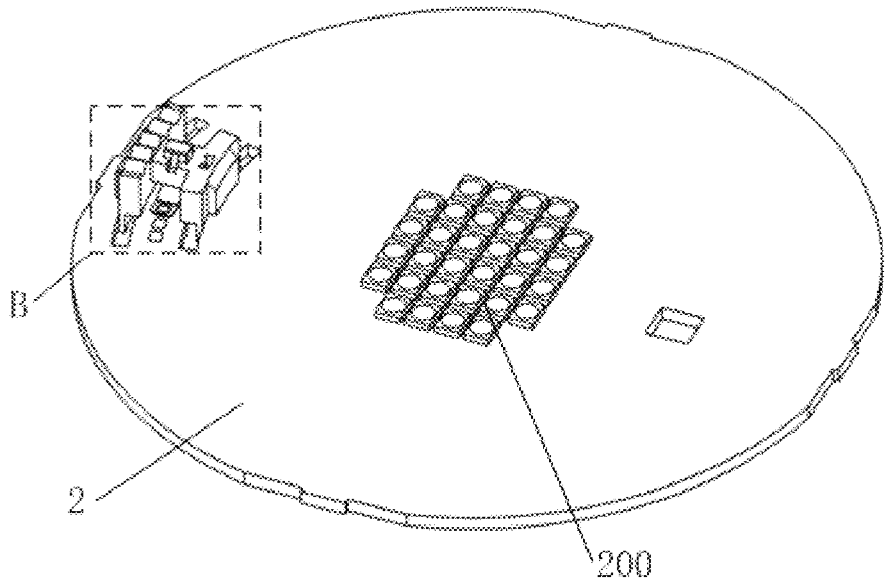
FIG. 3 is a schematic structural diagram of a substrate and a knob dimming assembly according to the present disclosure.

As shown in FIG. 2, according to specific embodiments of the present disclosure, the knob dimming lamp further includes a lamp holder 400 and a lampshade 500, where the lamp holder 400 is disposed at a lower part of the housing 100, and the lampshade 500 is disposed at an upper part of the housing 100. The substrate 2 may be a plate surface integrally formed by the housing, or may be independent plates made of different materials such as a PCB or an aluminum substrate. In this embodiment, the substrate 2 is made of an aluminum alloy, and the light-emitting assembly 200 is disposed on the substrate 2. Integrating the substrate 2 required for the knob dimming assembly 300 and the aluminum substrate 2 commonly used in the lamp and having both heat dissipation and supporting functions can simplify the structure of the lamp and improve the reliability of the lamp to the greatest extent. The aluminum substrate 2 has conductivity. When the aluminum substrate 2 serves as the substrate 2, to ensure that the contacts 5 and the conductive sheet 4 do not short-circuit due to the contact with the aluminum substrate 2, a corresponding part of the aluminum substrate 2 can be first coated with an insulating material, and then the contacts 5 are disposed on the surface of the insulating material. The light-emitting assembly 200 includes a light source and a drive circuit, the contacts 5 are electrically connected to the drive circuit, and the drive circuit is electrically connected to the light source. The light source may be a single LED light source, or an LED light source array composed of a plurality of LED particles. The drive circuit may be a common LED drive circuit. As required, the light source may also be a conventional light source such as a fluorescent lamp, a halogen lamp, and a tungsten filament lamp. In this case, the drive circuit needs to be replaced with a drive circuit of the corresponding light source.

It should be noted that the knob dimming assembly 300 may be applied to different lamps, such as downlights, spotlights, and energy-saving lamps, so the housing 100 may be made into different shapes such as a cylindrical shape, a square shape, and a trapezoidal shape as needed. This embodiment takes a PAR lamp as an example to describe the corresponding housing structure. The housing 100 is provided with a conical working portion 101, the knob dimming assembly 300 is located in the conical working portion 101, the substrate 2 is a circular flat plate, the lampshade 500 includes a shade body flat plate 501 and a light refracting mechanism, the substrate 2 is opposite to the shade body flat plate 501, the light-emitting assembly 200 is located in a center of the substrate 2, and the light refracting mechanism is disposed in a center of the shade body flat plate 501 and includes a lens 502 and a threaded lens 503 for generating a light condensing effect.

The descriptions above are preferred implementations of the present disclosure. It should be noted that for a person of ordinary skill in the art, various improvements and modifications can be made without departing from the principles of the present disclosure. These improvements and modifications should also be regarded as falling into the protection scope of the present disclosure.

The invention claimed is:

1. A lamp comprising:

a housing;

a light-emitting assembly disposed in the housing; and a switching assembly including a knob disposed on the housing and configured for rotation relative to the housing, a substrate including a plurality of contacts electrically connected to the light-emitting assembly, a slider disposed on the substrate and configured to slide along a predetermined trajectory relative to the substrate, and a conductive sheet disposed on the slider, wherein the knob abuts against a surface of the slider, rotation of the knob drives the slider to move such that the conductive sheet is communicated with different ones of the plurality of contacts.

2. The lamp according to claim 1, further comprising a light source and a drive circuit provided in the light-emitting assembly, wherein the substrate is made of an aluminum alloy, the light-emitting assembly is disposed on the substrate, the contacts are electrically connected to the drive circuit, and the drive circuit is electrically connected to the light source.

3. The lamp according to claim 1, further comprising a lamp holder disposed at a lower part of the housing; and a lampshade disposed at an upper part of the housing.

4. The lamp according to claim 3, further comprising a conical working portion provided in the housing; a shade body flat plate provided in the lampshade; a light refracting mechanism provided in the lampshade in a center of the shade body flat plate and having at least one lens, wherein the switching assembly is located in the conical working portion, the substrate is a circular flat plate located opposite to the shade body flat plate, and the light-emitting assembly is located in a center of the substrate.

5. The lamp according to claim 1, further comprising a knob sleeve provided in the housing; a first limiting ring provided at a tail end of the knob sleeve; a second limiting ring and a knob buckle provided on a side surface of the knob, wherein the second limiting ring is matched with a front end surface of the first limiting ring, and the knob buckle is matched with a rear end surface of the first limiting ring.

6. The lamp according to claim 5, further comprising a sealing groove formed in the side surface of the knob; and a sealing ring provided in the sealing groove, wherein the sealing ring abuts against an inner wall of the knob sleeve.

7. The lamp according to claim 5, further comprising a first conical surface provided on a front end surface of the first limiting ring, and a second conical surface provided in the second limiting ring and matched with the first conical surface.

8. The lamp according to claim 1, further comprising a clamping groove formed in the substrate, wherein the slider comprises a sliding body and a buckle extending into the clamping groove.

9. The lamp according to claim 8, wherein the sliding body is provided with a first abutting surface disposed on a side of the sliding body close to the contacts, and a second abutting surface disposed on a side of the sliding body away from the contacts, the first abutting surface and the second abutting surface both abut against an upper surface of the substrate, and the first abutting surface is longer than the second abutting surface.

10. The lamp according to claim 8, further comprising a toothed surface provided in the sliding body, and a gear provided in the knob, wherein the gear is engaged with the toothed surface.

11. The lamp according to claim 8, further comprising a flexible friction layer provided in at least one of the sliding body or the knob, wherein the sliding body and the knob abut against each other through the flexible friction layer.

12. The lamp according to claim 8, further comprising a plurality of limiting grooves formed in a wall of the clamping groove, and a limiting rod provided on the sliding body, one end of the limiting rod located in the limiting groove.

13. The lamp according to claim 12, further comprising a limiting rod clearance groove provided in the sliding body, the limiting rod clearance groove vertically passing through the sliding body, wherein the limiting rod is disposed in the limiting rod clearance groove.

14. The lamp according to claim 8, further comprising an offset member included in the buckle and having a side wall abutting against a side wall of the clamping groove; and a claw also included in the buckle and disposed at a bottom end of the offset member and snap-fitted on a bottom surface of the substrate, wherein the clamping groove is arc-shaped.

15. The lamp according to claim 14, wherein the buckle comprises a first front buckle and a first rear buckle provided in a same clamping groove, the offset member of the first front buckle abuts against one side wall of the clamping groove, and the offset member of the first rear buckle abuts against the other side wall of the clamping groove.

16. The lamp according to claim 14, wherein the clamping groove comprises a first clamping groove and a second clamping groove respectively extending along concentric arcs with different diameters; the buckle comprises a second front buckle and a second rear buckle respectively provided in different clamping grooves, the second front buckle is disposed in the first clamping groove, and the second rear buckle is disposed in the second clamping groove.

17. The lamp according to claim 8, wherein the conductive sheet further comprises an elastic sheet fixing portion having a U-shaped structure, elastic sheet contact portions symmetrically arranged on two sides of the elastic sheet fixing portion, an elastic sheet deformation portion connected to the elastic sheet fixing portion and the elastic sheet contact portions; and elastic sheet contacts provided at bottoms of the elastic sheet contact portions.

18. The lamp according to claim 17, further comprising locking plates provided on the two sides of the elastic sheet fixing portion and having upper ends connected to the elastic sheet fixing portion; locking plate accommodating holes receiving the locking plates a conductive sheet mounting hole provided in the sliding body such that the elastic sheet fixing portion extends into the conductive sheet mounting hole; and locking grooves provided in the sliding body on two sides of the conductive sheet mounting hole, wherein the locking plates are disposed in the locking grooves.

19. The lamp according to claim 17, wherein the plurality of contacts comprise gear contacts and a common contact, and the gear contacts and the common contact are arranged on a movement trajectory of the conductive sheet.

20. The lamp according to claim 19, further comprising two elastic sheet contacts provided in the conductive sheet, wherein the gear contacts are disposed on two sides of the common contact and, during movement of the conductive sheet, one elastic sheet contact is kept in contact with the common contact, and the other elastic sheet contact is kept in contact with one of the gear contacts.

* * * * *